(12) United States Patent
Gates et al.

(10) Patent No.: US 9,110,796 B2
(45) Date of Patent: Aug. 18, 2015

(54) APPARATUS AND CIRCUITRY FOR MEMORY-BASED COLLECTION AND VERIFICATION OF DATA INTEGRITY INFORMATION

(75) Inventors: Dennis E. Gates, Wichita, KS (US); John R. Kloeppner, Buhler, KS (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 1833 days.

(21) Appl. No.: 12/360,193

(22) Filed: Jan. 27, 2009

(65) Prior Publication Data

US 2010/0191910 A1    Jul. 29, 2010

(51) Int. Cl.
*G06F 12/00* (2006.01)
*G06F 13/00* (2006.01)
*G06F 11/07* (2006.01)
*G06F 12/08* (2006.01)

(52) U.S. Cl.
CPC ........ *G06F 11/0727* (2013.01); *G06F 11/0763* (2013.01); *G06F 12/0802* (2013.01)

(58) Field of Classification Search
None
See application file for complete search history.

(56) References Cited

U.S. PATENT DOCUMENTS

2009/0150599 A1*   6/2009   Bennett ................. 711/103
2009/0157973 A1*   6/2009   Li et al. ................. 711/133

* cited by examiner

*Primary Examiner* — Sean D Rossiter
(74) *Attorney, Agent, or Firm* — Duft Bornsen & Fettig

(57) ABSTRACT

Apparatus and circuitry are provided for supporting collection and/or verification of data integrity information. A circuitry in a storage controller is provided for creating and/or verifying a Data Integrity Block ("DIB"). The circuitry comprises a processor interface for coupling with the processor of the storage controller. The circuitry also comprises a memory interface for coupling with a cache memory of the storage controller. By reading a plurality of Data Integrity Fields ("DIFs") from the cache memory through the memory interface based on information received from the processor, the DIB is created in that each DIF in the DIB corresponds to a respective data block.

18 Claims, 4 Drawing Sheets

APPARATUS AND CIRCUITRY FOR MEMORY-BASED COLLECTION AND VERIFICATION OF DATA INTEGRITY INFORMATION

BACKGROUND

1. Field of the Invention

The invention relates generally to storage controllers and more specifically relates to supporting collection and verification of data integrity information.

2. Discussion of Related Art

A computer system typically comprises or connects to a storage system for storing data used by the computer system. The storage system typically comprises a storage controller for reading/writing data to/from a storage device. The storage device may be any of a number of devices including a hard drive that stores the data on a platter. However, a block of data written by the storage controller out to the storage device (and eventually to a storage media including the platter) may not be the same block of data later read in by the storage controller from storage device.

To provide better assurance that the same block of data written out by a storage controller is also read back, the industry has started to employ a Data Integrity Field ("DIF") for validating a data block. Typically, a DIF is 8 bytes long and a data block is 512 bytes long. When the storage controller writes out a data block to the storage device, a DIF generated based on the data block is also written out. When the storage controller reads in the data block from the storage device, the previously written DIF is also read in. The storage controller can then use the previously written DIF to validate that the data block has not been changed since the data block was previously written out.

However, many storage devices continue to only support 512 byte blocks, which is sufficient to store a typical data block but not its DIF. One solution implemented in a storage controller is to store a group of DIFs (for a corresponding group of data blocks) in their own Data Integrity Block ("DIB") on the storage device. In order to support this solution, storage controller manufacturers have implemented software in the storage controller to create the DIB, and to validate the DIFs within the DIB.

However, the DIB is created and/or updated whenever a data block needs to be written out. The DIFs within the DIB are also verified whenever data blocks are read in. Executing software to handle these new processing needs uses processing power of a processor of the storage controller, thus adding overhead to the storage controller and reducing the capability of the storage controller to perform other tasks. Additionally, the storage controller typically creates the DIB in a local cache memory before writing the DIB out to the storage device, and verifies the DIB in the local cache memory after reading in the DIB. But processing the DIB in the local cache memory is slow and inefficient. For example, accessing the local cache memory, which usually comprises Dynamic Random Access Memory ("DRAM"), involves significant latencies that delay the speed of both reading and writing DIFs/DIBs within the storage controller.

Thus it is an ongoing challenge to support collection and/or verification of data integrity information.

SUMMARY

The present invention solves the above and other problems, thereby advancing the state of the useful arts, by providing apparatus and circuitry for supporting collection and/or verification of data integrity information. A circuitry in a storage controller is provided for creating and/or verifying a Data Integrity Block ("DIB"). Rather than using processing power of a processor of the storage controller, creating and/or verifying the DIB is off loaded to the circuitry. The circuitry comprises a processor interface for coupling with the processor of the storage controller, allowing information from the processor to be received through the processor interface. The circuitry also comprises a memory interface for coupling with a cache memory of the storage controller. By reading a plurality of Data Integrity Fields ("DIFs") from the cache memory through the memory interface based on information received from the processor, the circuitry may create the DIB as the processor would, for example. Advantageously, the dedicated circuitry thus supports collection and/or verification of data integrity information without reducing the capability of the storage controller to perform other tasks.

In one aspect hereof, a circuitry in a storage controller is provided for creating a data integrity block ("DIB"), in that the DIB comprises a plurality of data integrity fields ("DIFs"). The circuitry comprises a processor interface for coupling with a processor of the storage controller. The circuitry also comprises a memory interface for coupling with a cache memory of the storage controller; the cache memory comprises the plurality of DIFs. Additionally, the circuitry comprises a collection element adapted for creating the DIB by reading the plurality of DIFs through the memory interface based on information received through the processor interface, and by writing the DIB to the cache memory. Each DIF corresponds to a respective data block.

Another aspect hereof provides a circuitry in a storage controller for verifying a data integrity block ("DIB"), in that the DIB comprises a first plurality of data integrity fields ("DIFs"). The circuitry comprises a processor interface for coupling with a processor of the storage controller. The circuitry also comprises a memory interface for coupling with a cache memory of the storage controller, in that the cache memory comprises the plurality of DIFs. The circuitry further comprises a verification element adapted for verifying the DIB, based on information received through the processor interface, by reading a second plurality of DIFs through the memory interface, comparing the first plurality of DIFs against the second plurality of DIFs, and generating an error signal when a DIF of the first plurality of DIFs does not match a corresponding DIF of the second plurality of DIFs. Each DIF corresponds to a respective data block.

Yet another aspect hereof provides a storage controller. The storage controller comprises a processor, a cache memory, and an assistant circuitry. The assistant circuitry comprises a processor interface for coupling with the processor and a memory interface for coupling with the cache memory. The assistant circuitry also comprises a collection element adapted for creating a first data integrity block ("DIB") by reading a first plurality of data integrity fields ("DIFs") through the memory interface based on information received through the processor interface, and by writing the DIB to the cache memory. The assistant circuitry further comprises a verification element adapted for verifying a second DIB, based on information received through the processor interface, by reading a second plurality of DIFs through the memory interface, comparing the second plurality of DIFs against DIFs of the second DIB, and generating an error signal when a DIF of the first plurality of DIFs does not match a corresponding DIF of the second plurality of DIFs. The first DIB comprises the first plurality of DIFs, and each DIF corresponds to a respective data block.

DETAILED DESCRIPTION OF THE DRAWINGS

Figure 1:
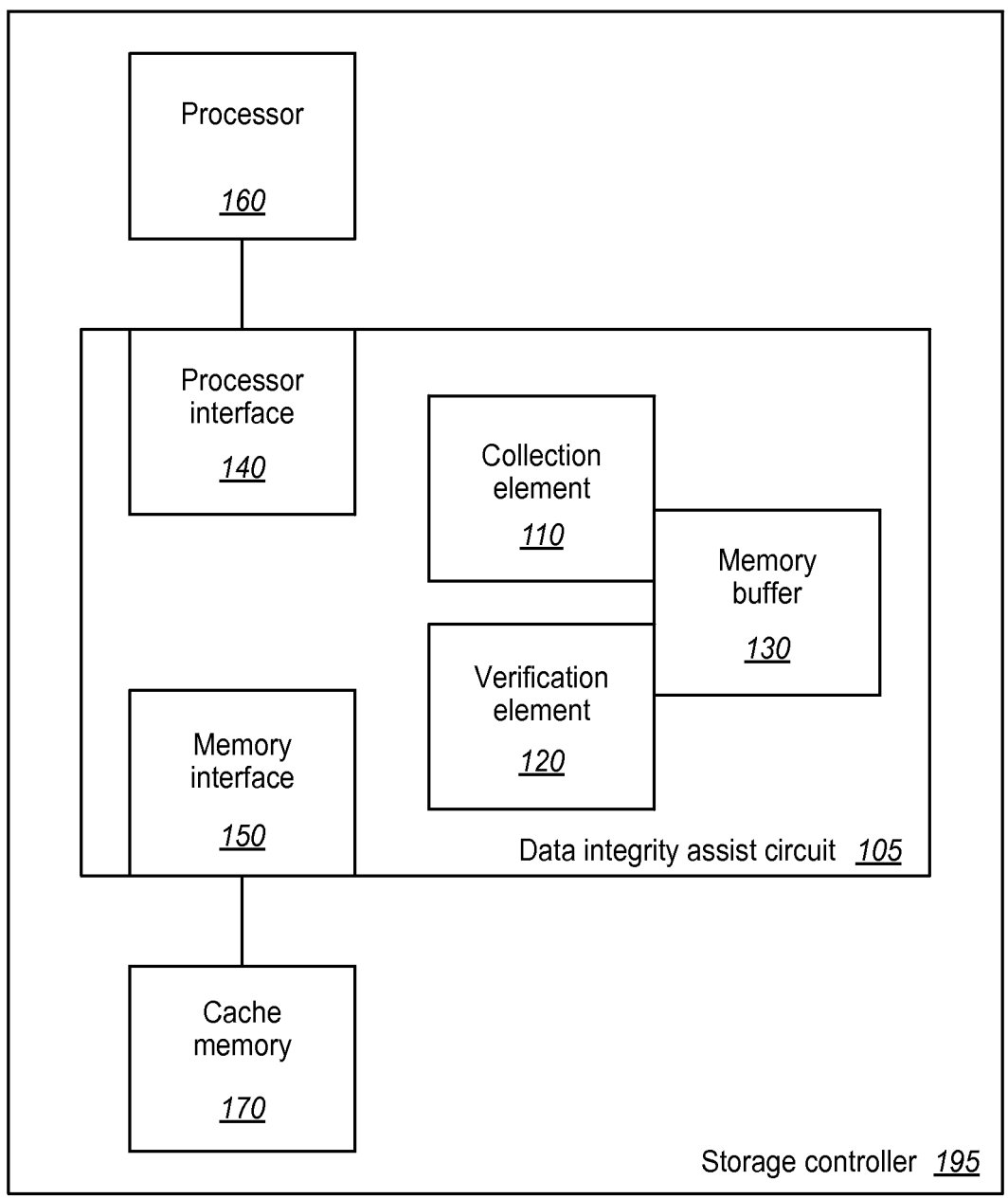
FIG. 1 is a block diagram of an exemplary storage controller comprising a data integrity assist circuit to support collection and verification of data integrity information in accordance with features and aspects hereof.

FIG. 1 is a block diagram of an exemplary storage controller 195 comprising a data integrity assist circuit 105 to support collection and verification of data integrity information in accordance with features and aspects hereof. The storage controller 195 comprises the data integrity assist circuit 105, a processor 160, and a cache memory 170. The storage controller 195 may be any controller or host bus adapter for connecting to a storage device or another storage controller. For example, the storage controller 195 may be a Redundant Array of Independent Disks ("RAID") controller. In other instances, the storage controller 195 may even be a controller for connection to a storage media (e.g., a platter) within a storage device (e.g., a hard drive). The processor 160 may comprise a microcontroller, a digital signal processor ("DSP"), or any processing element including those implemented in programmable logic. The cache memory 170 is typically used by the processor 160 for processing and storing data. For example, the cache memory 170 comprises blocks of data read from and/or to be stored to another device. Additionally, the cache memory 170 also comprises a plurality of data integrity fields ("DIFs") each corresponding to a respective data block. The cache memory 170 may comprise one of dynamic random access memory ("DRAM") and synchronous DRAM ("SDRAM").

The data integrity assist circuit 105 is in communication with the processor 160 and the cache memory 170. The data integrity assist circuit 105 comprises elements that assist the processor 160 for processing data. These elements of the data integrity assist circuit 105 are outside of and distinct from the processor 160. The data integrity assist circuit 105 may be implemented using any of a number of processing elements including customized integrated circuits and programmable logic, and may also be implemented to use processing power of another processor other than the processor 160. Accordingly, the data integrity assist circuit 105 may be implemented as part of an existing circuitry that already assists the processor 160 in processing data. For example, the data integrity assist circuit 105 may be implemented under additional states of an existing data processing state machine.

The data integrity assist circuit 105 comprises a processor interface 140, a memory interface 150, a collection element 110, a verification element 120, and a memory buffer 130. The processor interface 140 couples with the processor 160 to allow communication between the data integrity assist circuit 105 and the processor 160. For example, the processor interface 140 may comprise registers to allow the data integrity assist circuit 105 to assist the processor 160 as directed by the processor 160 and/or to report a result back to the processor 160. The memory interface 150 couples with the cache memory 170 to allow data to be read from and written to the cache memory 170. As noted above, the data integrity assist circuit 105 may be implemented as part of an existing circuitry. Hence, the processor interface 140, the memory interface 150, and/or their path to the processor 160 and the cache memory 170 may already exist in or may be based on the existing circuitry.

The collection element 110 is adapted for creating a data integrity block ("DIB") by reading a plurality of DIFs through the memory interface 150 based on information received through the processor interface 140, and writing the DIB back to the cache memory 170. The verification element 120 is adapted for verifying a DIB based on information received through the memory interface 140. More specifically, the DIB comprises a first plurality of DIFs. The verification element 120 is adapted for reading a second plurality of DIFs through the memory interface 150, comparing the first plurality of DIFs against the second plurality of DIFs, and generating an error signal when a DIF of the first plurality of DIFs does not match a corresponding DIF of the second plurality of DIFs.

The memory buffer 130 may comprise a type of memory that provides faster access than the cache memory 170. For example, the memory 130 may be other than DRAM or SDRAM; for these types of dynamic memory, an address is asserted to a memory chip by sending the row address and the column address separately to the memory chip. Instead, the memory 130 may comprise one of static random access memory ("SRAM"), a first-in first-out ("FIFO") memory, a register file, and/or a group of D flip-flops. Typically, memory of these types may be addressed by asserting a full address only once, which comprises sending the full address to a memory chip at the same time just once, as opposed to sending the row address and the column address separately at different times to a dynamic memory chip mentioned above. In some instances, the collection element 110 and the verification element 120 may be implemented as part of the processor 160, and the memory buffer 130 is provided as special cache for caching DIB/DIF data.

Figure 2:
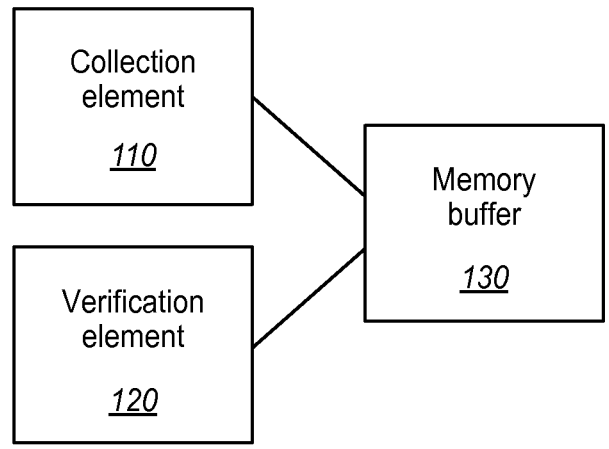
FIG. 2 is a block diagram showing exemplary additional details of a portion of the data integrity assist circuit in accordance with features and aspects hereof.

FIG. 2 is a block diagram showing exemplary additional details of a portion of the data integrity assist circuit in accordance with features and aspects hereof. The collection element 110 is directly connected to the memory buffer 130 through a dedicated path. Similarly, the verification element 120 is also directly connected to the memory buffer 130 through a dedicated path. The single memory buffer 130 is thus shared by both the collection element 110 and the verification element 120. However, the collection element 110 and the verification element 120 may not access the memory buffer 130 at the same time. Beneficially, having a dedicated path to the memory buffer 130 speeds up access of data in the memory buffer 130 because access to the memory buffer 130 is not shared with other elements and accesses are within the data integrity assist circuit 105.

Figure 3:
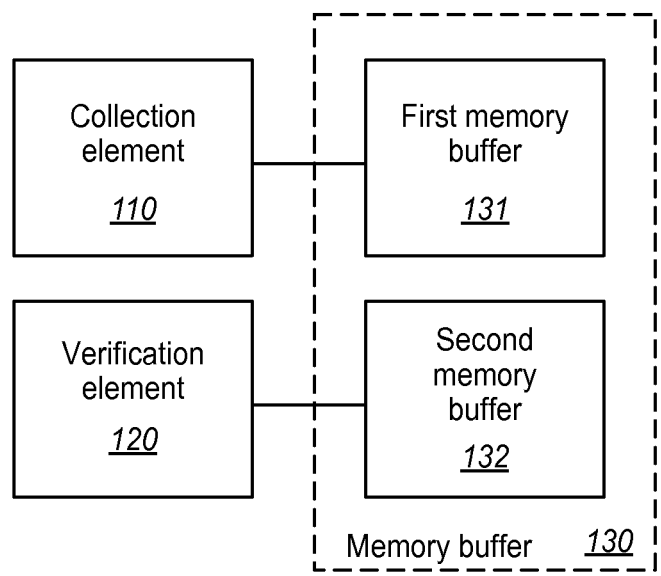
FIG. 3 is a block diagram showing alternative exemplary additional details of a portion of the data integrity assist circuit in accordance with features and aspects hereof.

FIG. 3 is a block diagram showing alternative exemplary additional details of a portion of the data integrity assist circuit in accordance with features and aspects hereof. The collection element 110 is directly connected to a first memory buffer 131 through a first dedicated path. Similarly, the verification element 120 is also directly connected to a second memory buffer 132 through a second dedicated path. In effect, the memory buffer 130 of FIG. 1 can be seen as comprising both the first memory buffer 131 and the second memory buffer 132 that are distinct from each other. Additionally, the dedicated paths are independent of each other and each dedicated path is also not shared with any other element. The collection element 110 may thus access the first memory buffer 131 at the same time when the verification element 120 accesses the second memory buffer 132. Beneficially, access of data in each memory buffer may be sped up without having to arbitrate between the collection element 110 and the verification element 120.

Those of ordinary skill in the art will readily recognize numerous additional and equivalent components and modules within a fully functional storage controller and/or data integrity assist circuit. Such additional and equivalent components are omitted herein for simplicity and brevity of this discussion. Thus, the structures of FIGS. 1 through 3 are intended merely as representatives of exemplary embodiments of features and aspects hereof.

Figure 4:
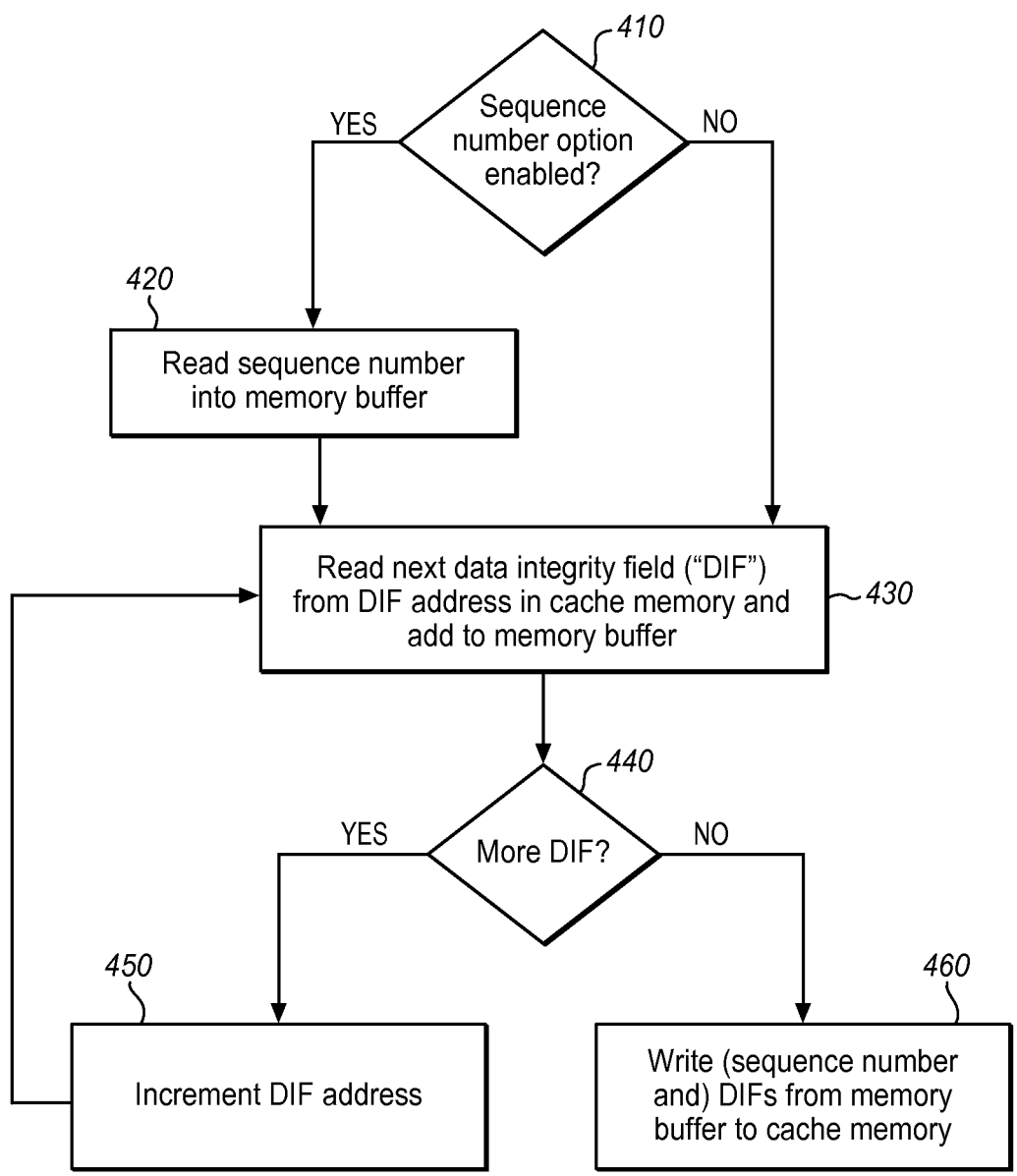
FIG. 4 is a flowchart describing an exemplary method in accordance with features and aspects hereof to create a DIB.

FIG. 4 is a flowchart describing an exemplary method in accordance with features and aspects hereof to create a DIB. The method may be operable as additional states of an existing data processing state machine and/or be operable in response to the processor and/or be invoked by the processor. At step 410, it is determined whether a sequence number option is enabled. The sequence number option may be always enabled, always disabled, or be configurable through administration by the user. The sequence number option allows a sequence number to be associated with a cache block (i.e., a group of data blocks), so that whenever the cache block is changed (i.e., whenever a data block in the group of data blocks is changed), the sequence number is also changed. The sequence number is stored both with the DIB (comprising a group of DIFs each associated with a data block) and at a separate storage location. Accordingly, if the change to the data block is not ultimately recorded, the change that has been lost can be detected by comparing the separately stored sequence numbers (i.e., if the change to the cache block is recorded, the separately stored sequence numbers should match).

If the sequence number option is enabled, a sequence number is read into the memory buffer at step 420 and processing then proceeds to step 430. The sequence number may be read from a dedicated register that is internal to the data integrity assist circuit. If the sequence number option is not enabled, processing proceeds to step 430. At step 430, a next DIF is read from a DIF address in cache memory, and the next DIF is added to the memory buffer. The DIF address pointer value (containing the DIF address) may be stored in a dedicated register that is internal to the data integrity assist circuit, and may have been configured by the processor of the storage controller. Beneficially, at least due to the different types of memory and the dedicated path to the memory buffer mentioned above, creating the DIB in the memory buffer by writing/adding the DIF to the memory buffer is faster than creating the DIB in the cache memory.

At step 440, it is determined if there is an additional DIF to be added to the memory buffer. This may be performed by checking whether a counter that contains the total number of DIF fields to be added has reached zero. The counter may be stored in a dedicated register that is internal to the data integrity assist circuit, and may have been configured by the processor of the storage controller. The counter may have been decremented as part of step 430 after a DIF has been added to the memory buffer.

If there is an additional DIF to be added to the memory buffer, the DIF address pointer value is incremented by a DIF offset value at step 450. The DIF offset value may be stored in a dedicated register that is internal to the data integrity assist circuit, and may have been configured by the processor of the storage controller. The DIF offset value may be 520 as it is the sum of a typical data block size of 512 bytes plus a typical DIF size of 8 bytes. Processing then returns to step 430 for reading the next DIF.

If there is not an additional DIF to be added to the memory buffer, the DIB has been created in the memory buffer comprising the DIFs that have been written/added to the memory buffer. At step 460, the DIB (comprising the DIFs) is written from the memory buffer to the cache memory at step 460, which is faster and more efficient than writing one DIF at a time to the cache memory if the memory buffer was not used. If the sequence number option is enabled, the sequence number is also written to the cache memory along with the DIB. The address in the cache memory that the DIB (or optionally the sequence number and the DIB) is written to may be stored in a dedicated register that is internal to the data integrity assist circuit, and may have been configured by the processor of the storage controller. The storage controller may subsequently store the DIB (or optionally the sequence number and the DIB) to a storage device (e.g., a hard drive). The storage controller may also store the sequence number separately to another storage device (e.g., a solid state disk).

It is noted that no particular ordering of the sequence number and the DIFs in the memory buffer is imposed, and steps 410 and 420 may be performed just prior to step 460 or as part of step 460. Indeed, the sequence number may be pre-pended or appended to the DIB.

Figure 5:
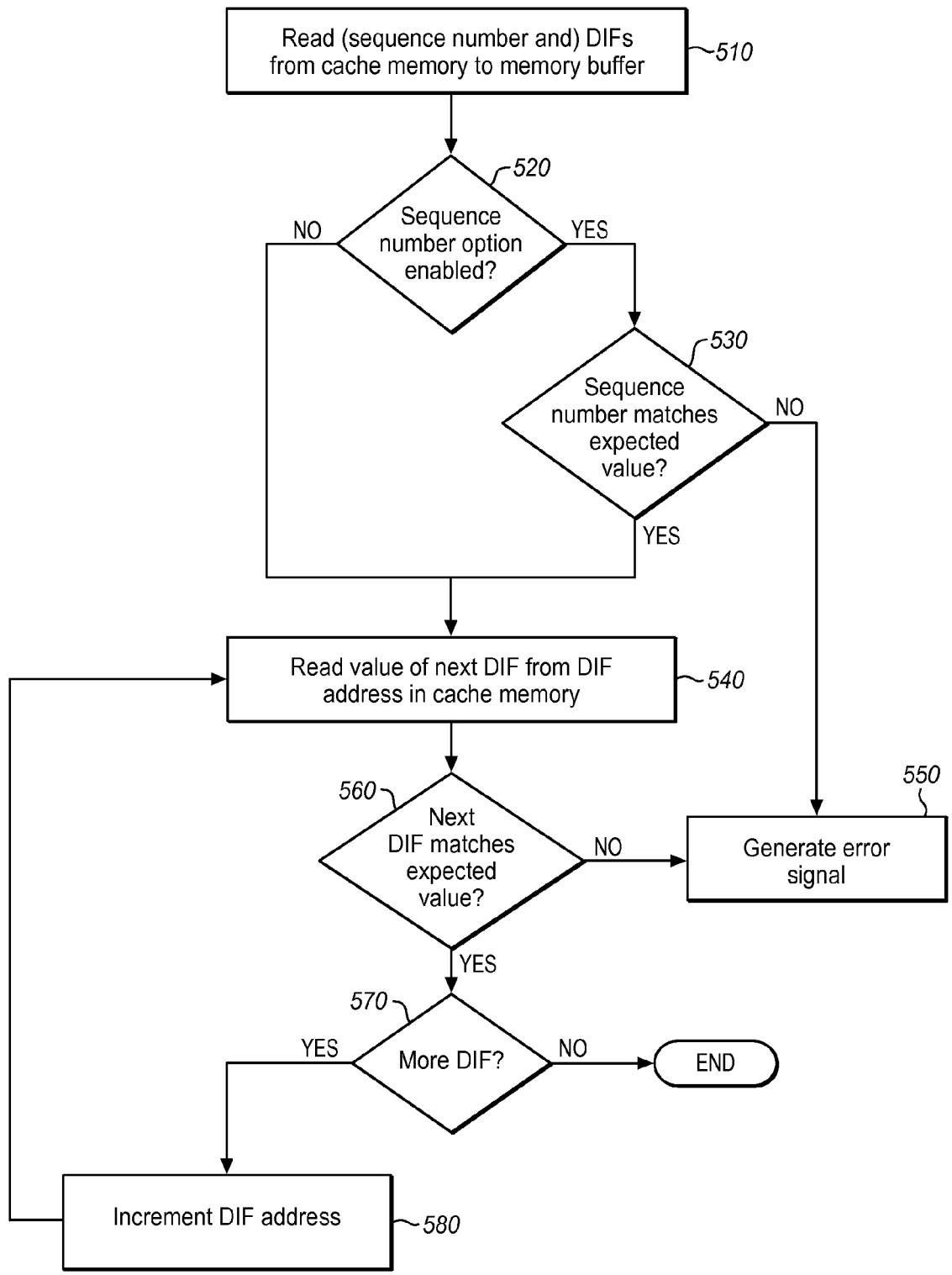
FIG. 5 is a flowchart describing an exemplary method in accordance with features and aspects hereof to verify a DIB.

FIG. 5 is a flowchart describing an exemplary method in accordance with features and aspects hereof to verify a DIB. The method may be operable as additional states of an existing data processing state machine and/or be operable in response to the processor and/or be invoked by the processor. At step 510, the DIB (comprising the DIFs and originally read from a storage device) is read from the cache memory into the memory buffer. The sequence number (originally read from the storage device along with the DIB) is also read from the cache memory into the memory buffer along with the DIB if the sequence number option is enabled. The address in the cache memory to read the DIB (or optionally the sequence number and the DIB) from may be stored in a dedicated register that is internal to the data integrity assist circuit, and may have been configured by the processor of the storage controller. It is noted that the sequence number may have previously been written along with the DIB to another device including a storage device.

At step 520, it is determined whether a sequence number option is enabled similar to step 420. If so, at step 530 the sequence number originally read from another device (e.g., a storage device including a hard drive) is compared with an expected sequence number read from yet another device (e.g., a solid state disk). The comparison may be performed by a dedicated comparator. The expected sequence number may have been stored in a dedicated register that is internal to the data integrity assist circuit, and may have been configured by the processor of the storage controller. If the values do not match, an error signal is generated at step 550, for example through the processor interface and through a driver so that a user may observe the error condition.

If the sequence number option is not enabled, or if the sequence numbers match, a value of a next DIF is read from a DIF address in the cache memory at step 540. It is noted that these DIF values are typically generated whenever a data block is read from a storage device. The DIF address pointer value (containing the DIF address) may be stored in a dedicated register that is internal to the data integrity assist circuit, and may have been configured by the processor of the storage controller. At step 560, the DIF value that has just been read is compared with its corresponding DIF in the memory buffer that has been read in as part of the DIB. The comparison may be performed by a dedicated comparator. If the values do not match, an error signal is generated at step 550, for example through the processor interface and through a driver so that a user may observe the error condition. However, this error signal may be different than the error signal generated when the sequence numbers do not match. If the DIF values match, processing proceeds to step 570.

At step 570, it is determined if there is an additional DIF that needs to be verified. This may be performed by checking whether a counter that contains the total number of DIF fields to be verified reaches zero. The counter may be stored in a dedicated register that is internal to the data integrity assist circuit, and may have been configured by the processor of the storage controller. The counter may have been decremented as part of steps 540 or 560. If there is not an additional DIF to be verified, verification of the DIB is complete, and a result may be returned to the processor. If there is an additional DIF to be verified, the DIF address pointer value is incremented by a DIF offset value at step 580. The DIF offset value may be stored in a dedicated register that is internal to the data integrity assist circuit, and may have been configured by the processor of the storage controller. Processing then returns to step 540 for reading the value of the next DIF.

As noted above, no particular ordering of the sequence number and the DIFs in the memory buffer is imposed, and steps 520 and 530 may be performed after it has been determined at step that there is not an additional DIF to be verified. Those of ordinary skill in the art will readily recognize numerous additional and equivalent steps that may be performed and/or omitted in the methods of FIGS. 4 and 5. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A circuitry in a storage controller for creating a data integrity block ("DIB"), wherein the DIB comprises a plurality of data integrity fields ("DIFs"), the circuitry comprising:
    a processor interface for coupling with a processor of the storage controller;
    a memory interface for coupling with a cache memory of the storage controller, wherein the cache memory comprises the plurality of DIFs; and
    a collection element adapted for creating the DIB by reading the plurality of DIFs through the memory interface based on information received through the processor interface, and by writing the DIB to the cache memory;
    wherein each DIF corresponds to a respective data block;
    wherein the collection element is further adapted for:
        writing a sequence number into the cache memory, the sequence number associated with the DIB and used for verification of the DIB; and
        writing the sequence number to an other memory;
    wherein the storage controller is adapted for altering the sequence number at the cache memory and the other memory each time each time a write is performed on data blocks corresponding with the DIFs of the DIB.

2. The circuitry of claim 1, further comprising a memory buffer, wherein the collection element is further adapted for creating the DIB in the memory buffer.

3. The circuitry of claim 2, wherein the collection element is further adapted for writing the DIB from the memory buffer to the cache memory.

4. The circuitry of claim 2, wherein a location of the memory buffer is addressable by asserting a full address to the memory buffer only once.

5. The circuitry of claim 2, wherein the memory buffer comprises one of a first-in-first-out ("FIFO") memory and a static random access memory ("SRAM").

6. A circuitry in a storage controller for verifying a data integrity block ("DIB"), wherein the DIB comprises a first plurality of data integrity fields ("DIFs"), the circuitry comprising:
    a processor interface for coupling with a processor of the storage controller;
    a memory interface for coupling with a cache memory of the storage controller, wherein the cache memory comprises the plurality of DIFs; and
    a verification element adapted for verifying the DIB, based on information received through the processor interface, by reading a second plurality of DIFs through the memory interface, comparing the first plurality of DIFs against the second plurality of DIFs, and generating an error signal when a DIF of the first plurality of DIFs does not match a corresponding DIF of the second plurality of DIFs;
    wherein each DIF corresponds to a respective data block;
    wherein the verification element is further adapted for:
        reading a previously written sequence number and the DIB from the cache memory, the sequence number associated with the DIB;
        comparing an expected sequence number from an other memory against the previously written sequence number from the cache memory; and
        generating an error signal when the expected sequence number does not match the previously written sequence number;
    wherein the storage controller is adapted for altering the previously written sequence number from the cache memory and the expected sequence number at the other memory each time each time a write is performed on data blocks corresponding with the DIFs of the DIB.

7. The circuitry of claim 6, further comprising a memory buffer, wherein the verification element is further adapted for reading the DIB from the cache memory to the memory buffer and verifying the first plurality of DIFs in the memory buffer.

8. The circuitry of claim 7, wherein a location of the memory buffer is addressable by asserting a full address to the memory buffer only once.

9. The circuitry of claim 6, further comprising a collection element adapted for creating the DIB by reading the first plurality of DIFs through the memory interface based on information received through the processor interface.

10. The circuitry of claim 9, further comprising a memory buffer, wherein the collection element is further adapted for creating the DIB in the memory buffer.

11. The circuitry of claim 10, wherein the memory buffer is a first memory buffer, and wherein the circuitry further comprises:
    a second memory buffer; and
    the collection element is further adapted for creating the DIB in the second memory buffer by reading the first plurality of DIFs through the memory interface based on information received through the processor interface, and writing the DIB from the second memory buffer to the cache memory.

12. A storage controller comprising:
a processor;
a cache memory;
an assistant circuitry comprising:
  a processor interface for coupling with the processor;
  a memory interface for coupling with the cache memory;
  a collection element adapted for creating a first data integrity block ("DIB") by reading a first plurality of data integrity fields ("DIFs") through the memory interface based on information received through the processor interface, and by writing the DIB to the cache memory; and
  a verification element adapted for verifying a second DIB, based on information received through the processor interface, by reading a second plurality of DIFs through the memory interface, comparing the second plurality of DIFs against DIFs of the second DIB, and generating an error signal when a DIF of the second DIB does not match a corresponding DIF of the second plurality of DIFs;
wherein the first DIB comprises the first plurality of DIFs; and
wherein each DIF corresponds to a respective data block;
wherein the collection element is further adapted for:
  writing a sequence number into the cache memory, the sequence number associated with the DIB and used for verification of the DIB; and
  writing the sequence number to an other memory;
wherein the storage controller is adapted for altering the sequence number at the cache memory and the other memory each time each time a write is performed on data blocks corresponding with the DIFs of the DIB.

13. The storage controller of claim 12 wherein:
the assistant circuitry further comprises a memory buffer; and
the collection element is further adapted for creating the first DIB in the memory buffer.

14. The storage controller of claim 13, wherein:
the collection element is further adapted for writing the first DIB from the memory buffer to the cache memory.

15. The storage controller of claim 13, wherein the collection element is further adapted for:
writing a sequence number into the memory buffer; and
writing the sequence number and the first DIB from the memory buffer to the cache memory.

16. The storage controller of claim 13, wherein:
a location of the memory buffer is addressable by asserting a full address to the memory buffer only once; and
the memory buffer comprises one of a first-in-first-out ("FIFO") memory and a static random access memory ("SRAM"), and the cache memory comprises one of dynamic random access memory ("DRAM") and synchronous DRAM ("SDRAM").

17. The storage controller of claim 12, wherein:
the assistant circuitry further comprises a first memory buffer and a second memory buffer;
the collection element is further adapted for creating the first DIB in the first memory buffer; and
the verification element is further adapted for reading the second DIB from the cache memory to the second memory buffer and verifying the DIFs of the second DIB in the second memory buffer.

18. The storage controller of claim 17, wherein:
the collection element is further adapted for writing the DIB from the first memory buffer to the cache memory.

* * * * *